No. 679,223. Patented July 23, 1901.
J. W. FLETCHER.
NUT LOCK.
(Application filed Jan. 17, 1901.)
(No Model.)
Fig. 1.
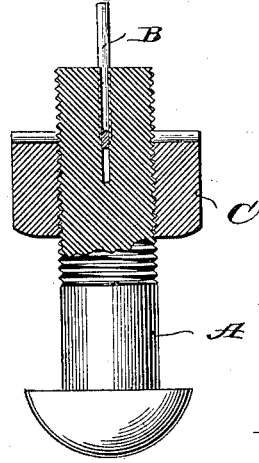
Fig. 2.
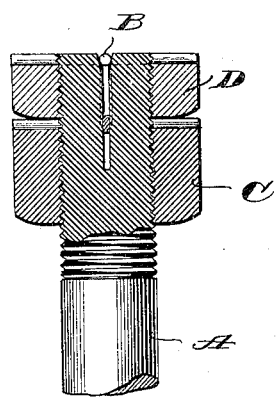
Fig. 3.
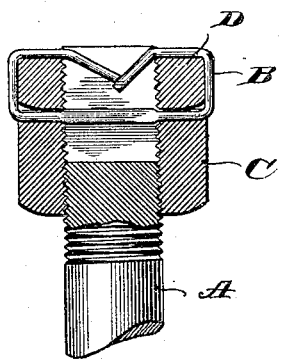
Fig. 5.
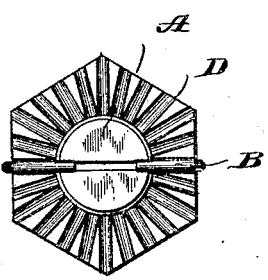
Fig. 4.
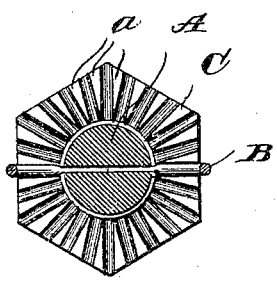
Fig. 6.
Witnesses
G. A. Paubenschmitt
Louis J. Arleon
Inventor
John W. Fletcher,
By Charles U. Hills.
Atty.

UNITED STATES PATENT OFFICE.

JOHN W. FLETCHER, OF CHICAGO, ILLINOIS.

NUT-LOCK.

SPECIFICATION forming part of Letters Patent No. 679,223, dated July 23, 1901.

Application filed January 17, 1901. Serial No. 43,565. (No model.)

*To all whom it may concern:*

Be it known that I, JOHN W. FLETCHER, a citizen of the United States, and a resident of Chicago, in the county of Cook and State of Illinois, have invented certain new and useful Improvements in Nut-Locks; and I do hereby declare that the following is a full, clear, and exact description thereof, reference being had to the accompanying drawings, and to the letters of reference marked thereon, which form a part of this specification.

This invention relates to improvements in nut-locks of that class in which an auxiliary nut is used as a jam-nut, and has for its object the production of cheap, simple, and effective means for securing a nut and the auxiliary rigidly in position upon a bolt or the like, and embraces means which, while securing the nut rigidly in position, enables an operator without destruction of the parts to remove said auxiliary nut and readjust the same.

The invention consists of the matters hereinafter described, and more fully pointed out and defined in the appended claims.

In the drawings, Figure 1 is a side elevation, partly in section, of a bolt having a nut secured thereon and illustrating part of the locking means. Fig. 2 is a similar view, partly in section, showing the locking means in position. Fig. 3 is a fragmentary view, partly in elevation and partly in longitudinal section, of the bolt and locking means, taken at a right angle with the section shown in Figs. 1 and 2. Fig. 4 is a plan view of the nut and part of the locking means, showing the bolt in section. Fig. 5 is an end elevation of the bolt and locking means. Fig. 6 is a side elevation of the locking rod or wire.

As shown in the drawings, A indicates a bolt, herein shown as a fish-bolt, headed at one end and screw-threaded at the other. Said bolt is cleft or slitted longitudinally of its screw-threaded end, said cleft or slit being of sufficient width to permit the insertion therein of the central flattened part of the locking rod or wire B. C indicates the nut, screw-threaded complementally of the bolt. Said nut on its outer surface is provided with a plurality of radial corrugations or ridges *a*, having between the same slots of approximately uniform width, so arranged that slots on the opposite sides of the nut lie in the line of a diameter, as shown in Fig. 4. D indicates the jam-nut, which may be, if preferred, provided on its outer end or surface with notches corresponding with the notches on the outer end or surface of the nut C. The nut C being turned on said bolt to the required position, the locking wire or rod B is inserted in the slitted end of the bolt, as indicated in Figs. 1 and 3, the central flattened portion of the same being only of sufficient length to fit in said slit. Said rod is pressed downwardly in said slit until the protruding ends of the same engage in notches on the opposite sides of the nut. The jam-nut B is then turned down, as indicated in Fig. 3, until said rod is jammed firmly into said notches. The ends of said rod are then turned upwardly over opposite edges of the jam-nut, as shown in Figs. 3 and 5, and bent inwardly, and the extremities inserted in the slit in the end of the bolt, thereby forming not only a lock for the nut C, but as well a lock for the jam-nut D. If at any time it is desired to remove the nut, said rod or wire may be partly straightened to permit the removal of the jam-nut, whereupon said rod may be slipped out of the slit and the nut removed. Said rod or wire may, if constructed of soft steel or other suitable material, be used several times without renewal.

Obviously, details of construction may be varied without departing from the principle of my invention.

I claim as my invention—

1. The combination with a bolt having a slotted end and a nut adapted to be secured thereon and radially notched on its outer face, of a rod or wire flattened centrally and secured at its middle in the slot of said bolt with its ends extending into the notches of the nut and a jam-nut acting to bind said rod or wire into engagement with said nut, the ends of said rod or wire being turned over said jam-nut and secured in the slot of said bolt when in position.

2. The combination with a bolt having a slotted end and a nut adapted to be secured thereon and radially corrugated on its outer face, of a rod or wire flattened centrally and secured at its middle in the slot of said bolt with its ends extending into the corrugations of the nut and a jam-nut also radially corrugated on its outer face and acting to bind said rod or wire into engagement in the corrugations of said nut, the ends of said rod or wire being turned over said jam-nut and into said radial corrugations thereon with the extremities bent downwardly and secured in the slot of said bolt when in position.

In witness whereof I have hereunto subscribed my name in the presence of two subscribing witnesses.

JOHN W. FLETCHER.

Witnesses:
  C. W. HILLS,
  LOUIS J. DELSON.